(12) United States Patent
Wei et al.

(10) Patent No.: US 12,387,428 B2
(45) Date of Patent: Aug. 12, 2025

(54) THREE-DIMENSIONAL RECONSTRUCTION METHOD, SYSTEM, AND STORAGE MEDIUM

(71) Applicant: SHANDONG YINGXIN COMPUTER TECHNOLOGIES CO., LTD., Jinan (CN)

(72) Inventors: Hui Wei, Jinan (CN); Ruyang Li, Jinan (CN); Yaqian Zhao, Jinan (CN); Rengang Li, Jinan (CN)

(73) Assignee: SHANDONG YINGXIN COMPUTER TECHNOLOGIES CO., LTD., Jinan (CN)

( * ) Notice: Subject to any disclaimer, the term of this patent is extended or adjusted under 35 U.S.C. 154(b) by 135 days.

(21) Appl. No.: 18/255,815

(22) PCT Filed: Jan. 28, 2022

(86) PCT No.: PCT/CN2022/074605
§ 371 (c)(1),
(2) Date: Jun. 2, 2023

(87) PCT Pub. No.: WO2022/179385
PCT Pub. Date: Sep. 1, 2022

(65) Prior Publication Data
US 2024/0005595 A1    Jan. 4, 2024

(30) Foreign Application Priority Data
Feb. 26, 2021    (CN) .......................... 202110222815.4

(51) Int. Cl.
*G06T 17/00*    (2006.01)
*G06T 7/70*    (2017.01)

(52) U.S. Cl.
CPC ................ *G06T 17/00* (2013.01); *G06T 7/70* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2014/0152660 A1 | 6/2014 | Lee et al. |
| 2020/0219272 A1 | 7/2020 | Pizer et al. |
| 2021/0232924 A1 | 7/2021 | Sun et al. |

FOREIGN PATENT DOCUMENTS

| CN | 106856012 A | 6/2017 |
| CN | 107845114 A | 3/2018 |

(Continued)

OTHER PUBLICATIONS

Dou et al. (End-to-end 3D face reconstruction with deep neural networks, CVPR17) (Year: 2017).*

(Continued)

*Primary Examiner* — Kyle Zhai
(74) *Attorney, Agent, or Firm* — Maschoff Brennan

(57) ABSTRACT

A three-dimensional reconstruction method, a system, and a non-transitory computer readable storage medium are disclosed herein. The method includes: performing local pose optimization by using a target image frame to obtain a local pose error; performing neural network prediction on the target image frame to obtain an initial reconstruction error; performing three-dimensional reconstruction according to the local pose error and the initial reconstruction error to obtain an initial reconstruction model; performing global pose optimization by using historical image frames to obtain a global optimization result and a global pose error; performing neural network completion on the global optimization result to obtain a final reconstruction error; and opti- (Continued)

mizing the initial reconstruction model according to the global pose error and the final reconstruction error to obtain a final reconstruction model. The three-dimensional reconstruction method can achieve high-quality and high-precision three-dimensional reconstruction more quickly and conveniently.

20 Claims, 3 Drawing Sheets

(56) References Cited

FOREIGN PATENT DOCUMENTS

| CN | 108364344 A | 8/2018 |
|---|---|---|
| CN | 108537848 A | 9/2018 |
| CN | 108846857 A | 11/2018 |
| CN | 109166171 A | 1/2019 |
| CN | 109215117 A | 1/2019 |
| CN | 109658449 A | 4/2019 |
| CN | 109816769 A | 5/2019 |
| CN | 109840939 A | 6/2019 |
| CN | 109848996 A | 6/2019 |
| CN | 109859296 A | 6/2019 |
| CN | 110276721 A | 9/2019 |
| CN | 110415336 A | 11/2019 |
| CN | 111178435 A | 5/2020 |
| CN | 111260661 A | 6/2020 |
| CN | 111311684 A | 6/2020 |
| CN | 111414923 A | 7/2020 |
| CN | 111739071 A | 10/2020 |
| CN | 111795687 A | 10/2020 |
| CN | 111862316 A | 10/2020 |
| CN | 111983639 A | 11/2020 |
| CN | 112070893 A | 12/2020 |
| CN | 112179338 A | 1/2021 |
| CN | 112219087 A | 1/2021 |
| CN | 112307917 A | 2/2021 |
| CN | 112347550 A | 2/2021 |
| CN | 112991515 A | 6/2021 |
| WO | 2018129794 A1 | 7/2018 |
| WO | 2021035669 A1 | 3/2021 |
| WO | 2021135271 A1 | 7/2021 |

OTHER PUBLICATIONS

Dai et al. (BundleFusion: Real-Time Globally Consistent 3D Reconstruction Using On-the-Fly Surface Reintegration, ACM Transactions on Graphics, 2017) (Year: 2017).*
Search Report for Corresponding European Patent Application No. 22758750.8 dated May 28, 2024, 10 pages.
Hoang, Dinh-Cuong, et al, "Object-RPE: Dense 3D Reconstruction and Pose Estimation with Convolutional Neural Networks for Warehouse Robots", European Conference on Mobile Robots (ECMR), IEEE, Sep. 4, 2019, pp. 1-6.
Wang, Chen, et al:, "DenseFusion: 6D Object Pose Estimation by Iterative Dense Fusion", IEEE/CVF Conference on Computer Vision and Pattern Recognition (CVPR), IEEE, Jun. 15, 2019, pp. 3338-3347.
Hoang, Dinh-Cuong, et al., "Object-RPE: Dense 3D reconstruction and pose estimation with convolutional neural networks", Robotics and Autonomous Systems, Elsevier BV, vol. 133, Aug. 27, 2020, 10 pages.
Han, Xiaoguang, et al., "High-Resolution Shape Completion Using Deep Neural Networks for Global Structure and Local Geometry Inference", IEEE International Conference on Computer Vision (ICCV), Oct. 22, 2017, pp. 85-93.
International Search Report dated Apr. 7, 2022; International Application No. PCT/CN2022/074605.
Written Opinion of the International Searching Authority dated Apr. 7, 2022; International Application No. PCT/CN2022/074605.
The First Office Action of the corresponding Chinese application; Application No. 2021102228154.
Optimization Algorithm of Visual Odometry for Slam based on Local Image Entropy dated Jun. 2021, vol. 47, No. 6, 7 pages.
Notification of Grant of Invention Patent Right dated Jul. 27, 2022; Application No. 202110222815.4; 4 pages.

* cited by examiner

THREE-DIMENSIONAL RECONSTRUCTION METHOD, SYSTEM, AND STORAGE MEDIUM

CROSS-REFERENCE TO RELATED APPLICATION

The present application is the U.S. National Stage of PCT/CN2022/074605 filed on Jan. 28, 2022, which claims priority of Chinese Patent Application No. 202110222815.4 filed to the China Patent Office on Feb. 26, 2021, entitled 'THREE-DIMENSIONAL RECONSTRUCTION METHOD AND DEVICE, AND RELATED EQUIPMENT', the entire contents of which are incorporated herein by reference.

FIELD

The present application relates to the field of a virtual reality technology, particularly relates to a three-dimensional reconstruction method, and further relates to a three-dimensional reconstruction system, and a non-transitory computer readable storage medium.

BACKGROUND

A virtual reality technology is a multidisciplinary technology that uses computers to simulate the real world. Scenes displayed in virtual reality mainly can be divided into two categories according to generation modes: virtual objects generated completely by the computers and virtual objects generated based on real physical objects. Under the objective of pursuing the consistency between a virtual environment and a real physical environment, the virtual objects generated based on the real physical objects have obvious advantages due to high consistency thereof with the real world. Three-dimensional reconstruction is a technology that uses various sensor devices to perform scanning and computing processing on a real physical scene so as to generate a corresponding digital virtual model, and may provide the virtual reality with display contents that are highly consistent with the real physical world.

At present, relatively high-precision three-dimensional reconstruction, such as a high-precision three-dimensional reconstruction technology represented by volume photography, may be achieved based on complex sensor devices and computing devices. Such technology requires a huge sensor array composed of many cameras, the number of cameras generally may be up to hundreds of units, and meanwhile, huge computing power is required to provide computing support for the reconstruction process. Although such technology has achieved good application in the professional field, it cannot be popularized to the field of virtual reality application in a large scale due to limitations of factors such as site, cost, use convenience. However, three-dimensional reconstruction based on a consumer-grade sensor commonly has the problem of incorrect or even failed reconstruction due to influence of factors such as a measurement error of the sensor, image data quality, a motion state of the sensor, richness of scene features.

Therefore, how to achieve high-quality and high-precision three-dimensional reconstruction more quickly and conveniently is an urgent problem to be solved by those skilled in the art.

SUMMARY

The objective of the present application is to provide a three-dimensional reconstruction method. The three-dimensional reconstruction method may achieve high-quality and high-precision three-dimensional reconstruction more quickly and conveniently. Another objective of the present application is to provide a three-dimensional reconstruction system, and a non-transitory computer readable storage medium, which all have the above-mentioned beneficial effects.

In the first aspect, the present application provides a three-dimensional reconstruction method, including:

Taking a current image frame obtained by scanning a target through a sensor as a target image frame, and performing local pose optimization by using the target image frame to obtain a local pose error;

Performing neural network prediction on the target image frame to obtain an initial reconstruction error;

Performing three-dimensional reconstruction according to the local pose error and the initial reconstruction error to obtain an initial reconstruction model;

Taking image frames previous to the target image frame in an image sequence obtained by scanning the target through the sensor as historical image frames, and performing global pose optimization by using the historical image frames to obtain a global optimization result and a global pose error;

Performing neural network completion on the global optimization result to obtain a final reconstruction error; and Optimizing the initial reconstruction model according to the global pose error and the final reconstruction error to obtain a final reconstruction model as a virtual reality result of three-dimensional reconstruction of the target.

In an embodiment of the present application, the step of performing neural network prediction on the target image frame to obtain the initial reconstruction error includes:

Training a neural network by using general sample data to obtain an initial neural network model;

Performing modification on the initial neural network model by using the historical image frames and a final reconstruction model corresponding to each of the historical image frames to obtain a neural network prediction model; and Performing neural network prediction on the target image frame by using the neural network prediction model to obtain the initial reconstruction error.

In an embodiment of the present application, the step of performing three-dimensional reconstruction according to the local pose error and the initial reconstruction error to obtain the initial reconstruction model includes:

Constructing an initial optimization object function by using the local pose error and the initial reconstruction error;

Solving the initial optimization object function to obtain initial pose data when the initial optimization object function takes the minimum value; and Performing three-dimensional reconstruction by using the initial pose data to obtain the initial reconstruction model.

In an embodiment of the present application, the step of optimizing the initial reconstruction model according to the global pose error and the final reconstruction error to obtain the final reconstruction model as a virtual reality result of three-dimensional reconstruction of the target includes:

Constructing a global optimization object function by using the global pose error and the final reconstruction error;

Solving the global optimization object function to obtain global pose data when the global optimization object function takes the minimum value; and Optimizing the initial reconstruction model by using the global pose data to obtain the final reconstruction model.

In an embodiment of the present application, the step of optimizing the initial reconstruction model according to the global pose error and the final reconstruction error to obtain the final reconstruction model as a virtual reality result of three-dimensional reconstruction of the target includes:

Constructing a global optimization object function by using the local pose error, the initial reconstruction error, the global pose error, and the final reconstruction error;

Solving the global optimization object function to obtain global pose data when the global optimization object function takes the minimum value; and Optimizing the initial reconstruction model by using the global pose data to obtain the final reconstruction model.

In the second aspect, the present application further discloses a three-dimensional reconstruction system, including:

A memory, which is configured to store a computer program; and

A processor, which is configured to execute the computer program to implement the steps of any one of the above-mentioned three-dimensional reconstruction methods.

In the third aspect, the present application further discloses a non-transitory computer readable storage medium. The computer readable storage medium has stored thereon a computer program which, when executed by a processor, implements the steps of any one of the above-mentioned three-dimensional reconstruction methods.

The three-dimensional reconstruction method provided by the present application includes: performing local pose optimization by using the target image frame to obtain the local pose error; performing neural network prediction on the target image frame to obtain the initial reconstruction error; performing three-dimensional reconstruction according to the local pose error and the initial reconstruction error to obtain the initial reconstruction model; performing global pose optimization by using the historical image frames to obtain the global optimization result and the global pose error; performing neural network completion on the global optimization result to obtain the final reconstruction error; and optimizing the initial reconstruction model according to the global pose error and the final reconstruction error to obtain the final reconstruction model as a virtual reality result of three-dimensional reconstruction of the target.

It can thus be seen that according to the three-dimensional reconstruction method provided by the present application, firstly, by using the local construction method which combines local pose optimization and neural network prediction, computing is performed through the local pose error and the neural network prediction error, i.e., the initial reconstruction error, so as to obtain a relatively precise local reconstruction result; and then by using the global reconstruction method which combines global pose optimization and neural network completion, computing is performed through the global pose error and the neural network completion error, i.e., the final reconstruction error, so as to obtain a high-quality global reconstruction result, thereby implementing a hierarchical reconstruction optimization strategy of local combined optimization and global combined optimization, obtaining the high-quality reconstruction object by the persistent improving process, and ensuring precision of the reconstruction result. In addition, such implementation mode does not need to lay out a huge sensor array, so that the implementation cost of three-dimensional reconstruction is greatly reduced.

The three-dimensional reconstruction system, and the non-transitory computer readable storage medium provided by the present application all have the above-mentioned beneficial effects which are not repeated herein.

BRIEF DESCRIPTION OF THE DRAWINGS

In order to more clearly illustrate the technical solutions in the prior art and the embodiments of the present application, the drawings that need to be used in the description in the prior art and the embodiments of the present application will be briefly described in the following. Certainly, the drawings below related to the embodiments of the present application only describe part of the embodiments of the present application, those ordinary skilled in the art also can obtain other drawings, without any inventive work, according to the provided drawings, and the obtained other drawings also shall fall within the scope of protection of the present application.

DETAILED DESCRIPTION

The core of the present application is to provide a three-dimensional reconstruction method. The three-dimensional reconstruction method may achieve high-quality and high-precision three-dimensional reconstruction more quickly and conveniently. Another core of the present application is to provide a three-dimensional reconstruction apparatus and system, and a non-transitory computer readable storage medium, which all have the above-mentioned beneficial effects.

In order to describe the technical solution of the embodiments of the present application more clearly and completely, the technical solution of the embodiments of the present application will be illustrated below in connection with the drawings related to the embodiments of the present application. It is obvious that the described embodiments are just a part but not all of the embodiments of the present application. Based on the embodiments of the present application, those ordinary skilled in the art can obtain other embodiment(s), without any inventive work, which all shall fall within the scope of protection of the present application.

Figure 1:
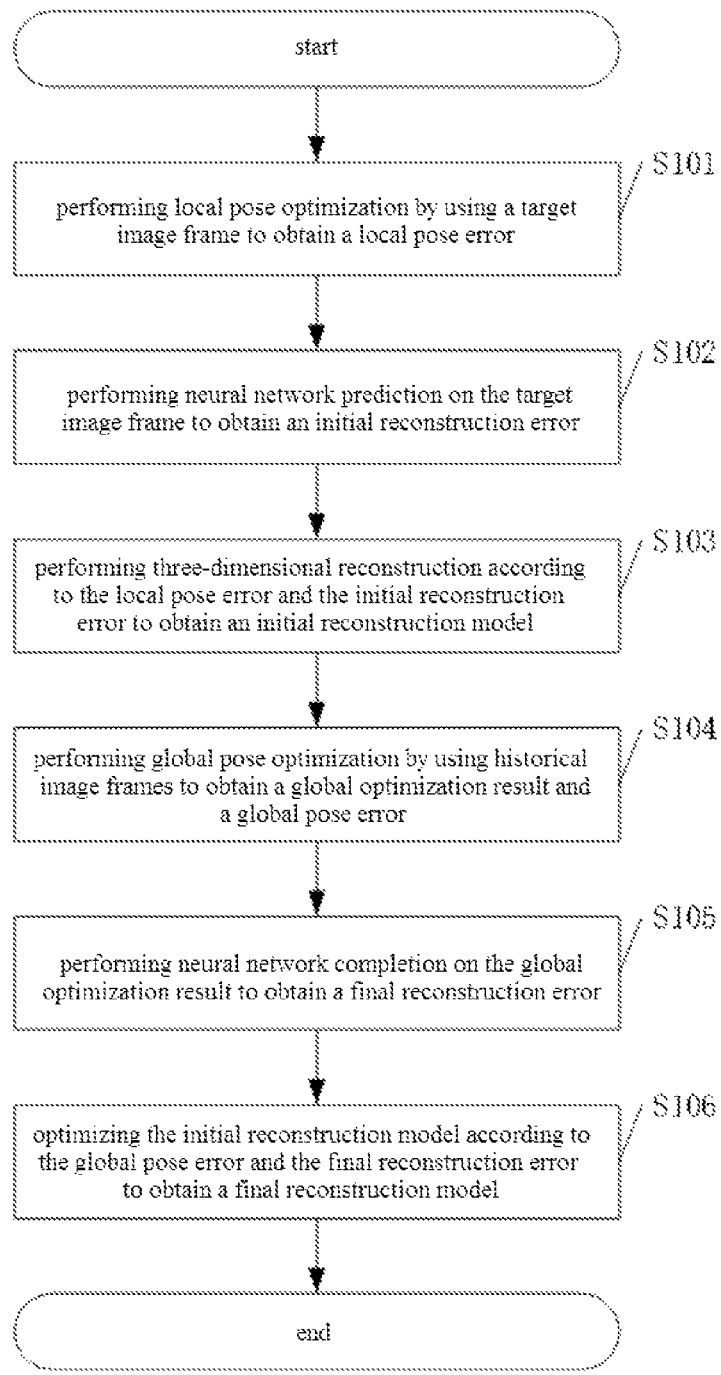
FIG. 1 is a flow schematic diagram of a three-dimensional reconstruction method provided by the present application.

With reference to FIG. 1, FIG. 1 is a flow schematic diagram of a three-dimensional reconstruction method provided by the present application. The three-dimensional reconstruction method may include:

S101: a current image frame obtained by scanning a target through a sensor is taken as a target image frame, and local pose optimization is performed by using the target image frame to obtain a local pose error.

This step aims to use the target image frame to implement local pose optimization to obtain the local pose error corresponding to a local pose optimization result, wherein the target image frame is a current image frame obtained by scanning a target through a sensor, and the sensor types include, but are not limited to, a monocular camera, a binocular camera, a RGBD camera, a laser scanner, a radar, etc. In the specific implementing process, a local pose optimization method based on a geometric method may be used for implementation, such as a motion restoration structure, simultaneous localization, and similar methods commonly used in image construction. In addition, in order to implement local pose optimization, a plurality of image frames adjacent to the target image frame may also be used for implementation so as to further improve accuracy of the local pose optimization result.

S102: neural network prediction is performed on the target image frame to obtain an initial reconstruction error.

This step aims to obtain a three-dimensional reconstruction result of a next image frame and a corresponding neural network prediction error thereof, i.e., the initial reconstruction error, by performing neural network prediction on the target image frame, wherein the neural network prediction process may be implemented based on a neural network prediction model, and the neural network prediction model may be a network model that is trained in advance and can be directly used, or may be a network model obtained by gradually adjusting and optimizing an initial network model trained in advance in the online reconstruction process; and certainly, the neural network type of the neural network prediction model is not unique, and the present application does not make any limit to it.

As an optional embodiment, the step that neural network prediction is performed on the target image frame to obtain the initial reconstruction error may include: a neural network is trained by using general sample data to obtain an initial neural network model; modification is performed on the initial neural network model by using the historical image frames and a final reconstruction model corresponding to each of the historical image frames to obtain a neural network prediction model; and neural network prediction is performed on the target image frame by using the neural network prediction model to obtain the initial reconstruction error.

This optional embodiment provides a neural network prediction method, i.e., the method is implemented by an online optimized neural network prediction model. Specifically, firstly, the neural network is trained by using the general sample data to obtain the initial neural network model, wherein the general sample data is obtained by acquisition in advance and includes an image frame and a corresponding three-dimensional reconstruction result thereof, and it could be understood that the greater the size of the general sample data is, the higher the corresponding model precision is; further, the above-mentioned initial neural network model is adjusted and optimized by using the historical image frames and a three-dimensional reconstruction model, i.e., the final reconstruction model, corresponding to each of the historical image frames to obtain the higher-precision neural network prediction model, wherein each of the historical image frames refers to each image frame previous to the target image frame in an image sequence; and finally, neural network prediction is performed on the target image by using the optimized neural network prediction model, so that a three-dimensional reconstruction model corresponding to a next image frame and a corresponding initial reconstruction error thereof can be obtained, and certainly, the three-dimensional reconstruction model obtained herein is merely a prediction result, rather than a final three-dimensional reconstruction result.

In addition, before the initial neural network model is modified and optimized by using the historical image frames and the three-dimensional reconstruction model corresponding to each of the historical image frames, non-ideal data such as a missing region of the three-dimensional reconstruction model and the like may also be removed so as to ensure accuracy of optimized samples, thereby improving precision of the neural network prediction model and ensuring precision of a neural network prediction result.

S103: three-dimensional reconstruction is performed according to the local pose error and the initial reconstruction error to obtain an initial reconstruction model.

This step aims to implement local reconstruction to obtain the initial reconstruction model. Specifically, three-dimensional reconstruction is performed by combining the local pose error and the initial reconstruction error to implement local reconstruction which combines local pose optimization and neural network prediction so as to obtain a relatively precise local reconstruction result, i.e., the initial reconstruction model.

As an optional embodiment, the step that three-dimensional reconstruction is performed according to the local pose error and the initial reconstruction error to obtain the initial reconstruction model may include: an initial optimization object function is constructed by using the local pose error and the initial reconstruction error; the initial optimization object function is solved to obtain initial pose data when the initial optimization object function takes the minimum value; and three-dimensional reconstruction is performed by using the initial pose data to obtain the initial reconstruction model.

This optional embodiment provides a local reconstruction method. Specifically, a local combined optimization problem is constructed by local pose optimization and neural network prediction, i.e., the initial optimization object function is constructed by using the local pose error and the initial reconstruction error; the initial optimization object function is solved; and when the initial optimization object function takes the minimum value, the initial pose data corresponding to the minimum value is obtained, so that by using the initial pose data to perform three-dimensional reconstruction, the initial reconstruction model can be obtained.

S104: image frames previous to the target image frame in an image sequence obtained by scanning the target through the sensor are taken as historical image frames, and global pose optimization is performed by using historical image frames to obtain a global optimization result and a global pose error.

This step aims to implement global pose optimization by using the historical image frames to obtain the global pose optimization result and the corresponding global pose error thereof, wherein each of the historical image frames refers to each image frame previous to the target image frame in the image sequence. In the specific implementing process, similarly, a global pose optimization method based on a geometric method can also be adopted for implementation, and in addition, when the number of the image frames in the image sequence is relatively large, in order to implement rapid global pose optimization, part of key image frames in the image sequence can also be selected for implementation so as to further improve the global pose optimization efficiency.

S105: neural network completion is performed on the global optimization result to obtain a final reconstruction error.

This step aims to obtain a corresponding neural network completion error, i.e., the above-mentioned final reconstruction error, by performing neural network completion on the global optimization result, wherein the neural network completion process may be implemented based on a corresponding neural network completion model, and similarly, the neural network completion model may be a network model which is trained in advance and can be directly used, or may a network model obtained by gradually adjusting and optimizing an initial network model trained in advance in the online reconstruction process; and moreover, the neural network type of the neural network completion model is not unique, and the present application does not make any limit to it.

S106: the initial reconstruction model is optimized according to the global pose error and the final reconstruction error to obtain a final reconstruction model as a virtual reality result of three-dimensional reconstruction of the target.

This step aims to implement global reconstruction to obtain the final reconstruction model as a virtual reality result of three-dimensional reconstruction of the target. Specifically, the above-mentioned initial reconstruction model is optimized by combining the global pose error and the final reconstruction error so as to implement global reconstruction which combines the global pose optimization and the neural network completion, thereby obtaining a high-quality high-precision global reconstruction result, i.e., the above-mentioned final reconstruction model.

As an optional embodiment, the step that the initial reconstruction model is optimized according to the global pose error and the final reconstruction error to obtain the final reconstruction model as a virtual reality result of three-dimensional reconstruction of the target may include: a global optimization object function is constructed by using the global pose error and the final reconstruction error; the global optimization object function is solved to obtain global pose data when the global optimization object function takes the minimum value; and the initial reconstruction model is optimized by using the global pose data to obtain the final reconstruction model as a virtual reality result of three-dimensional reconstruction of the target.

This optional embodiment provides a global reconstruction method. Specifically, a global combined optimization problem can be constructed by global pose optimization and neural network completion, i.e., the global optimization object function is constructed by using the global pose error and the final reconstruction error; the global optimization object function is solved; and when the global optimization object function takes the minimum value, the global pose data corresponding to the minimum value is obtained, so that by using the global pose data to optimize the initial reconstruction model, the final reconstruction model can be obtained as a virtual reality result of three-dimensional reconstruction of the target.

As an optional embodiment, the step that the initial reconstruction model is optimized according to the global pose error and the final reconstruction error to obtain the final reconstruction model may include: a global optimization object function is constructed by using the local pose error, the initial reconstruction error, the global pose error, and the final reconstruction error; the global optimization object function is solved to obtain global pose data when the global optimization object function takes the minimum value; and the initial reconstruction model is optimized by using the global pose data to obtain the final reconstruction model as a virtual reality result of three-dimensional reconstruction of the target.

This optional embodiment provides another local reconstruction method. Specifically, a global solving optimization problem can be constructed, in other words, a global combined optimization problem is constructed jointly by local pose optimization, neural network prediction, global pose optimization, and neural network completion, i.e., the global optimization object function is constructed by using the local pose error, the initial reconstruction error, the global pose error, and the final reconstruction error; the global optimization object function is solved; and when the global optimization object function takes the minimum value, the global pose data corresponding to the minimum value is obtained, so that by using the global pose data to optimize the initial reconstruction model, the final reconstruction model can be obtained as a virtual reality result of three-dimensional reconstruction of the target.

It can thus be seen that according to the three-dimensional reconstruction method provided by the present application, firstly, by using the local construction method which combines local pose optimization and neural network prediction, computing is performed through the local pose error and the neural network prediction error, i.e., the initial reconstruction error, so as to obtain a relatively precise local reconstruction result; and then by using the global reconstruction method which combines global pose optimization and neural network completion, computing is performed through the global pose error and the neural network completion error, i.e., the final reconstruction error, so as to obtain a high-quality global reconstruction result, thereby implementing a hierarchical reconstruction optimization strategy of local combined optimization and global combined optimization, obtaining the high-quality reconstruction object by the persistent improving process, and ensuring precision of the reconstruction result. In addition, such implementation mode does not need to lay out a huge sensor array, so that the implementation cost of three-dimensional reconstruction is greatly reduced.

Another embodiment of the present application provides another three-dimensional reconstruction method.

Figure 2:
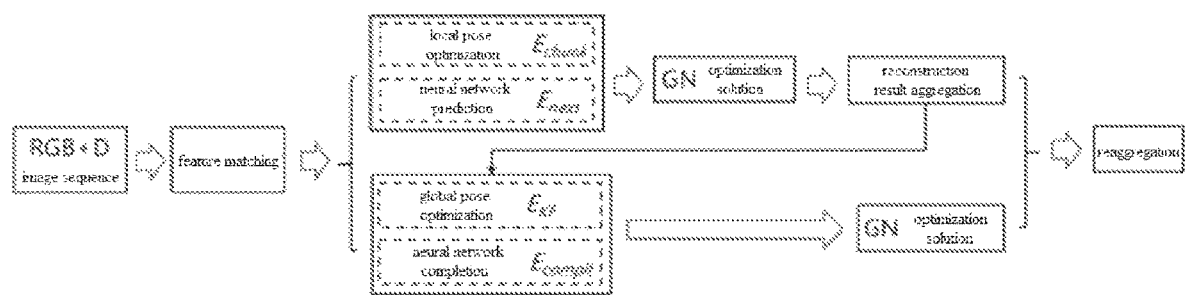
FIG. 2 is a flow schematic diagram of another three-dimensional reconstruction method provided by the present application.

With reference to FIG. 2, FIG. 2 is a flow schematic diagram of another three-dimensional reconstruction method provided by the present application. The three-dimensional reconstruction method includes the following specific implementation flow:

Step 1: reconstruction result prediction based on a neural network is performed:

Based on data which a sensor has scanned, a reconstruction result to be obtained by scanning a next frame is predicted by the neural network, a corresponding prediction error estimation (an initial reconstruction error) is used as one of optimization object functions, there is no limitation to the type of the neural network used for prediction, and the process mainly includes the following works:

(1) the neural network is pre-trained by using some general data sets to obtain an initial neural network model;

(2) the initial neural network model is adjusted and modified by using data which a current sensor has scanned and a result (historical data frames and a final reconstruction model corresponding to each of the historical data frames) which has been reconstructed;

(3) in the process (2), non-ideal data such as a missing region of a reconstructed three-dimensional model and the like is removed so as to avoid adverse impact on the neural network model; and (4) a three-dimensional model to be obtained by a next frame of scanned data is predicted by using the neural network model modified and optimized in the work (2), so that an error metric $E_{next}$ can be obtained in this prediction process, and the error metric $E_{next}$ is used as one of object functions of the subsequent optimization problem.

Step 2: local pose optimization based on a geometric method is performed:

Local pose optimization based on the geometric method may be implemented in virtue of some existing typical methods at present, such as a structure from motion, similar methods commonly used in simultaneous localization and mapping. In this step, data of a current scanned frame or a plurality of adjacent frames is used to compute to obtain an error metric $E_{chunk}$ (a local pose error). Certainly, the computing result $E_{chunk}$ of this step is just used for constructing one of constraint conditions of the subsequent optimization problem, but not directly used for solving a reconstruction result.

Step 3: combined optimization is solved to obtain an initial reconstruction result:

A combined optimization problem is constructed by the error metric $E_{next}$ and $E_{chunk}$ obtained in Step 1 and Step 2, the initial reconstruction result is obtained by solving the optimization problem, and the process mainly include the following works:

(1) an initial optimization object function is constructed and is defined as: $E_{Initial}=E_{next}+E_{chunk}$;

(2) the optimization problem is solved to obtain pose data (initial pose data) that satisfies a condition that $E_{Initial}$ is the minimum; and (3) three-dimensional reconstruction is performed by using the pose data obtained by solving, and the initial reconstruction result (an initial reconstruction model) is obtained by model aggregation.

Step 4: reconstruction result completion based on the neural network and global pose optimization are performed:

In this step, mainly the global optimization work is executed. This step includes two parts of global pose optimization based on a geometric method and reconstruction completion based on the neural network. Error metrics of two parts are used as object functions to jointly construct a global optimization problem, and a final reconstruction result is obtained by solving the global optimization problem, wherein there is no limitation to the type of the used neural network, and the process mainly includes the following works:

(1) global pose optimization based on the geometric method is performed: computing is performed by using a conventional geometric pose estimation method on the basis of all the scanned frame data obtained by the sensor up to now or part of selected key frame data so as to obtain a global pose optimization result (a global optimization result) and an error metric $E_{KF}$ (a global pose error) corresponding to the result;

(2) reconstruction result completion based on the neural network is performed: when merely the reconstruction result of the geometric method is adopted, there may be problems of hole missing, etc., so the pose optimization result obtained in the work (1) can be completed by a neural network method so as to obtain an error metric $E_{complt}$ (a final reconstruction error) of a complete reconstruction result, wherein the neural network may be a network model which is trained in advance, can be directly used, and may also be implemented by combining a model similar with the pre-trained initial model in Step 1 and an online adjustment and optimization method;

(3) a global optimization object function is defined as: $E_{final}=E_{KF}+E_{complt}$, and by solving the optimization problem, the minimum value that satisfies the optimization object is selected as the final reconstruction result (global pose data); and certainly, a structure of the global optimization object may also adopt a form that $E_{final}=E_{KF}+E_{complt}+E_{next}+E_{chunk}$ and is obtained by integrally solving the optimization problem; and (4) reaggregation is performed and the final reconstruction model is obtained: the initial reconstruction result obtained by aggregation in Step 3 is adjusted and optimized according to the final reconstruction result obtained in the work (3), so that the final reconstruction model can be obtained.

It can thus be seen that according to the three-dimensional reconstruction method provided by the embodiment of the present application, firstly, by using the local construction method which combines local geometric optimization and neural network prediction, an optimization object is constructed jointly through a local geometric optimization error metric and a neural network prediction error metric, and the optimization object is solved to obtain a relatively precise local reconstruction result; and then by using the global reconstruction method which combines global geometric optimization and neural network completion, an optimization object is constructed jointly through a global geometric optimization error metric and a neural network completion error metric, the optimization object is solved to obtain a high-quality high-precision global reconstruction result, thereby implementing a hierarchical reconstruction optimization strategy of local combined optimization and global combined optimization, obtaining the high-quality reconstruction object by the persistent improving process, and ensuring precision of the reconstruction result. In addition, such implementation mode does not need to lay out a huge sensor array, so that the implementation cost of three-dimensional reconstruction is greatly reduced.

Figure 3:
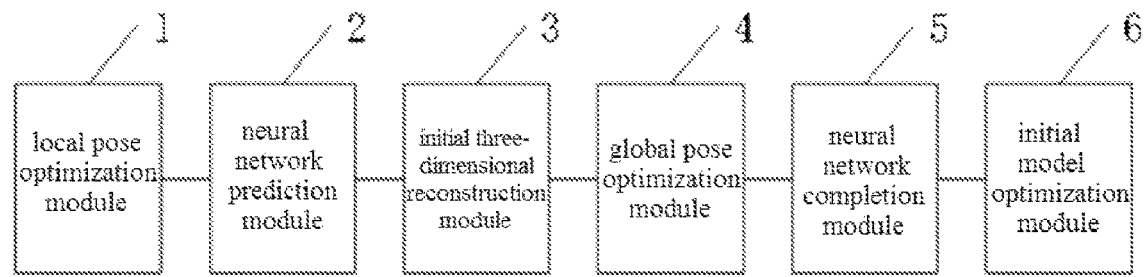
FIG. 3 is a structural schematic diagram of a three-dimensional reconstruction apparatus provided by the present application.

In order to solve the technical problem above, the present application further provides a three-dimensional reconstruction apparatus. With reference to FIG. 3, FIG. 3 is a structural schematic diagram of a three-dimensional reconstruction apparatus provided by the present application. The three-dimensional reconstruction apparatus may include:

A local pose optimization module 1, which is configured to take a current image frame obtained by scanning a target through a sensor as a target image frame, and perform local pose optimization by using the target image frame to obtain a local pose error;

A neural network prediction module 2, which is configured to perform neural network prediction on the target image frame to obtain an initial reconstruction error;

An initial three-dimensional reconstruction module 3, which is configured to perform three-dimensional reconstruction according to the local pose error and the initial reconstruction error to obtain an initial reconstruction model;

A global pose optimization module 4, which is configured to take image frames previous to the target image frame in an image sequence obtained by scanning the target through the sensor as historical image frames, and perform global pose optimization by using the historical image frames to obtain a global optimization result and a global pose error;

A neural network completion module 5, which is configured to perform neural network completion on the global optimization result to obtain a final reconstruction error; and An initial model optimization module 6, which is configured to optimize the initial reconstruction model according to the global pose error and the final reconstruction error to obtain a final reconstruction model as a virtual reality result of three-dimensional reconstruction of the target.

It can thus be seen that according to the three-dimensional reconstruction apparatus provided by the embodiment of the present application, firstly, by using a local construction method which combines local pose optimization and neural network prediction, computing is performed through the local pose error and the neural network prediction error, i.e., the initial reconstruction error, so as to obtain a relatively precise local reconstruction result; and then by using a global reconstruction method which combines global pose optimization and neural network completion, computing is performed through the global pose error and the neural network completion error, i.e., the final reconstruction error, so as to obtain a high-quality global reconstruction result, thereby implementing a hierarchical reconstruction optimization strategy of local combined optimization and global combined optimization, obtaining the high-quality reconstruction object by the persistent improving process, and ensuring precision of the reconstruction result. In addition, such implementation mode does not need to lay out a huge sensor array, so that the implementation cost of three-dimensional reconstruction is greatly reduced.

As an optional embodiment, the neural network prediction module 2 can be specifically configured to train a neural network by using general sample data to obtain an initial neural network model; perform modification on the initial neural network model by using the historical image frames and a final reconstruction model corresponding to each of the historical image frames to obtain a neural network prediction model; and perform neural network prediction on the target image frame by using the neural network prediction model to obtain the initial reconstruction error.

As an optional embodiment, the initial three-dimensional reconstruction module 3 can be specifically configured to construct an initial optimization object function by using the local pose error and the initial reconstruction error; solve the initial optimization object function to obtain initial pose data when the initial optimization object function takes the minimum value; and perform three-dimensional reconstruction by using the initial pose data to obtain the initial reconstruction model.

As an optional embodiment, the initial model optimization module 6 can be specifically configured to construct a global optimization object function by using the global pose error and the final reconstruction error; solve the global optimization object function to obtain global pose data when the global optimization object function takes the minimum value; and optimize the initial reconstruction model by using the global pose data to obtain the final reconstruction model as a virtual reality result of three-dimensional reconstruction of the target.

As an optional embodiment, the initial model optimization module 6 can be specifically configured to construct a global optimization object function by using the local pose error, the initial reconstruction error, the global pose error, and the final reconstruction error; solve the global optimization object function to obtain global pose data when the global optimization object function takes the minimum value; and optimize the initial reconstruction model by using the global pose data to obtain the final reconstruction model as a virtual reality result of three-dimensional reconstruction of the target.

The illustration on the apparatus provided by the present application refers to the method embodiments above and will not be repeated herein.

Figure 4:
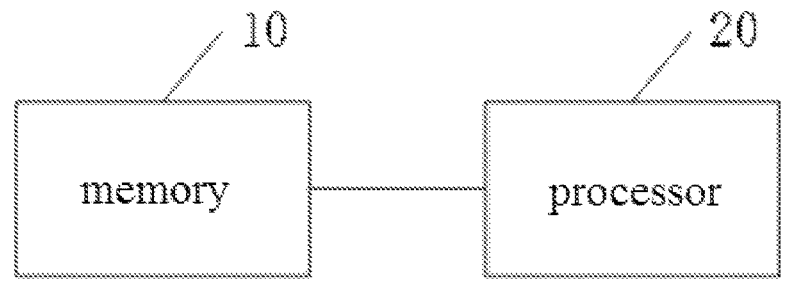
FIG. 4 is a structural schematic diagram of a three-dimensional reconstruction system provided by the present application.

In order to solve the technical problem above, the present application further provides a three-dimensional reconstruction system. With reference to FIG. 4, FIG. 4 is a structural schematic diagram of a three-dimensional reconstruction system provided by the present application. The three-dimensional reconstruction system may include:

A memory 10, which is configured to store a computer program; and

A processor 20, which is configured to execute the computer program to implement the steps of any one of the three-dimensional reconstruction methods as mentioned above.

The illustration on the system provided by the present application refers to the method embodiments above and will not be repeated herein.

Figure 5:
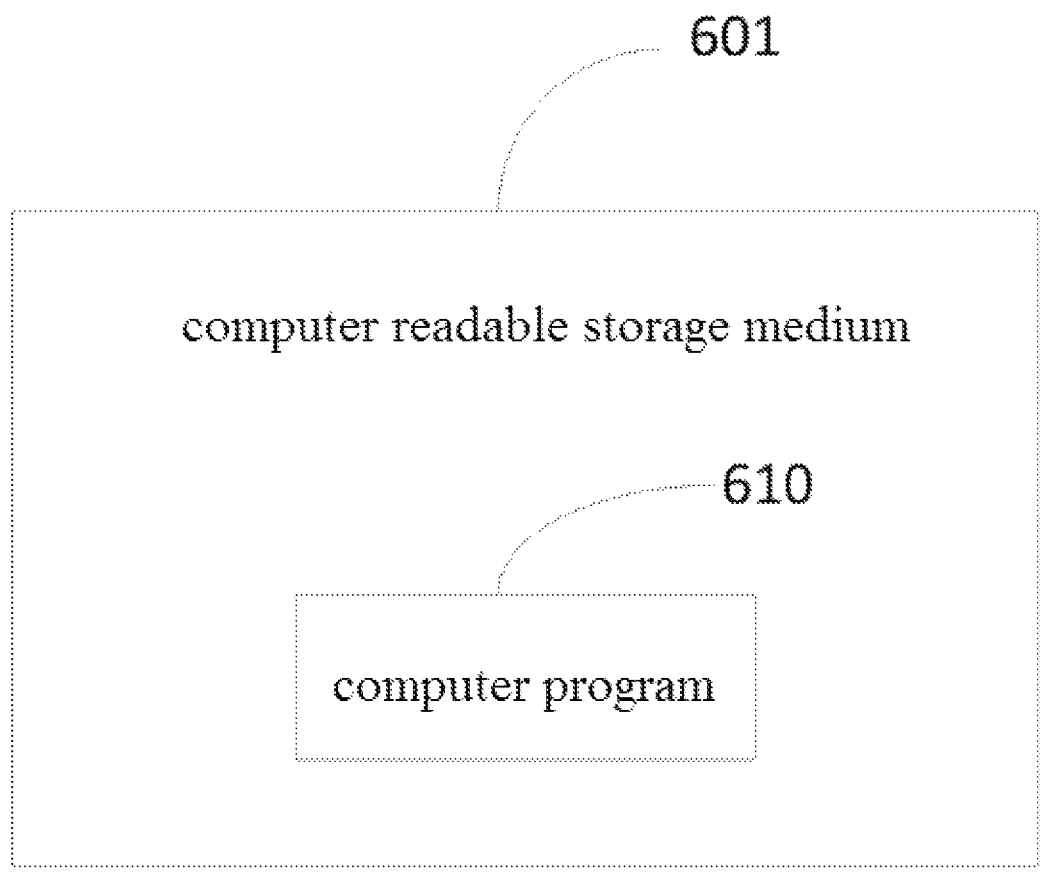
FIG. 5 is a schematic diagram of a non-transitory computer readable storage medium provided by the present application.

In order to solve the problem above, the present application further provides a non-transitory computer readable storage medium. FIG. 5 shows a schematic diagram of a non-transitory computer readable storage medium provided by the present application. As shown in FIG. 5, a computer program 610 is stored on the non-transitory computer readable storage medium 601, and when executed by a processor, can implement the steps of any one of the three-dimensional reconstruction methods as mentioned above.

The non-transitory computer readable storage medium 601 may include: various mediums capable of storing program codes, such as a U disk, a mobile hard disk, a Read-Only Memory (ROM), a Random Access Memory (RAM), a diskette or an optical disk.

The illustration on the non-transitory computer readable storage medium provided by the present application refers to the method embodiments above and will not be repeated herein.

Each embodiment in the specification is described in a progressive mode, each embodiment is focused on differences from other embodiments, and the same or similar parts among all the embodiments can refer to each other. The apparatus disclosed by the embodiments corresponds to the method disclosed by the embodiments, and thus is described simply, and the related parts may refer to the description of the method part.

Those professional skilled may also further realize that the unit and algorithm steps of each example described in combination with the embodiments disclosed herein can be implemented by electronic hardware, computer hardware or a combination thereof, and in order to illustrate interchangeability of hardware and software clearly, the composition and steps of each example have been generally described according to functions in the description above. Whether these functions are executed in a hardware or software mode is depended on the specific application and design constraint conditions of the technical solution. Those professional skilled can use a different method for each specific application so as to achieve the described functions, but such achievement should not be considered to go beyond the scope of the present application.

The steps of the method or the algorithm described in combination with the embodiments disclosed herein may be implemented by directly using hardware, a software module executed by the processor, or a combination thereof. The software module may be disposed in a RAM, a memory, a ROM, an electrically programmable ROM, an electrically erasable programmable ROM, a register, a hard disk, a removable disk, a CD-ROM or any other forms of storage mediums well known in the technical art.

The above illustrates the technical solution provided by the present application in details. Specific examples are applied herein to illustrate the principle and implementation mode of the present application, and the illustration on the embodiments above are merely used for helping to understand the method of the present application and the core concept thereof. It should be noted that those ordinary skilled in the technical art may also make many improvements and modifications to the present application without departure from the principle of the present application, and these improvements and modifications also shall fall within the scope of protection of the present application.

The invention claimed is:

1. A three-dimensional reconstruction method, comprising:
  taking a current image frame obtained by scanning a target through a sensor as a target image frame, and performing local pose optimization by using the target image frame to obtain a local pose error;
  performing neural network prediction on the target image frame to obtain an initial reconstruction error;
  performing three-dimensional reconstruction according to the local pose error and the initial reconstruction error to obtain an initial reconstruction model;
  taking image frames previous to the target image frame in an image sequence obtained by scanning the target through the sensor as historical image frames, and performing global pose optimization by using the historical image frames to obtain a global optimization result and a global pose error;
  performing neural network completion on the global optimization result to obtain a final reconstruction error; and
  optimizing the initial reconstruction model according to the global pose error and the final reconstruction error to obtain a final reconstruction model as a virtual reality result of three-dimensional reconstruction of the target.

2. The three-dimensional reconstruction method according to claim 1, wherein the step of performing neural network prediction on the target image frame to obtain the initial reconstruction error comprises:
  training a neural network by using general sample data to obtain an initial neural network model;
  performing modification on the initial neural network model by using the historical image frames and a final reconstruction model corresponding to each of the historical image frames to obtain a neural network prediction model; and
  performing the neural network prediction on the target image frame by using the neural network prediction model to obtain the initial reconstruction error.

3. The three-dimensional reconstruction method according to claim 2, wherein the general sample data is obtained by acquisition in advance and includes an image frame and a corresponding three-dimensional reconstruction result.

4. The three-dimensional reconstruction method according to claim 2, wherein the step of performing neural network prediction on the target image frame to obtain the initial reconstruction error further comprises:
  before the initial neural network model is modified and optimized by using the historical image frames and a three-dimensional reconstruction model corresponding to each of the historical image frames, removing non-ideal data of a missing region of the three-dimensional reconstruction model.

5. The three-dimensional reconstruction method according to claim 1, wherein the step of performing three-dimensional reconstruction according to the local pose error and the initial reconstruction error to obtain the initial reconstruction model comprises:
  constructing an initial optimization object function by using the local pose error and the initial reconstruction error;
  solving the initial optimization object function to obtain initial pose data when the initial optimization object function takes the minimum value; and
  performing three-dimensional reconstruction by using the initial pose data to obtain the initial reconstruction model.

6. The three-dimensional reconstruction method according to claim 1, wherein the step of optimizing the initial reconstruction model according to the global pose error and the final reconstruction error to obtain the final reconstruction model as a virtual reality result of three-dimensional reconstruction of the target comprises:
  constructing a global optimization object function by using the global pose error and the final reconstruction error;
  solving the global optimization object function to obtain global pose data when the global optimization object function takes the minimum value; and
  optimizing the initial reconstruction model by using the global pose data to obtain the final reconstruction model.

7. The three-dimensional reconstruction method according to claim 1, wherein the step of optimizing the initial reconstruction model according to the global pose error and the final reconstruction error to obtain the final reconstruction model as a virtual reality result of three-dimensional reconstruction of the target comprises:
  constructing a global optimization object function by using the local pose error, the initial reconstruction error, the global pose error, and the final reconstruction error;
  solving the global optimization object function to obtain global pose data when the global optimization object function takes the minimum value; and
  optimizing the initial reconstruction model by using the global pose data to obtain the final reconstruction model.

8. The three-dimensional reconstruction method according to claim 1, wherein the step of taking image frames previous to the target image frame in an image sequence obtained by scanning the target through the sensor as historical image frames and performing global pose optimization by using the historical image frames to obtain a global optimization result and a global pose error comprises:
  when the number of the image frames in the image sequence is relatively large, selecting part of key image frames in the image sequence as the historical image frames.

9. A three-dimensional reconstruction system, comprising:
  a memory, which is configured to store a computer program; and
  a processor, which is configured to execute the computer program to implement steps of the three-dimensional reconstruction method, wherein the steps comprise:
  taking a current image frame obtained by scanning a target through a sensor as a target image frame, performing local pose optimization by using the target image frame to obtain a local pose error;
  performing neural network prediction on the target image frame to obtain an initial reconstruction error;
  performing three-dimensional reconstruction according to the local pose error and the initial reconstruction error to obtain an initial reconstruction model;

taking image frames previous to the target image frame in an image sequence obtained by scanning the target through the sensor as historical image frames, and performing global pose optimization by using the historical image frames to obtain a global optimization result and a global pose error;

performing neural network completion on the global optimization result to obtain a final reconstruction error; and optimizing the initial reconstruction model according to the global pose error and the final reconstruction error to obtain a final reconstruction model as a virtual reality result of three-dimensional reconstruction of the target.

10. The three-dimensional reconstruction system according to claim 9, wherein the step of performing neural network prediction on the target image frame to obtain the initial reconstruction error comprises:

training a neural network by using general sample data to obtain an initial neural network model;

performing the modification on the initial neural network model by using the historical image frames and a final reconstruction model corresponding to each of the historical image frames to obtain a neural network prediction model; and performing neural network prediction on the target image frame by using the neural network prediction model to obtain the initial reconstruction error.

11. The three-dimensional reconstruction system according to claim 10, wherein the step of performing neural network prediction on the target image frame to obtain the initial reconstruction error further comprises:

before the initial neural network model is modified and optimized by using the historical image frames and a three-dimensional reconstruction model corresponding to each of the historical image frames, removing non-ideal data of a missing region of the three-dimensional reconstruction model.

12. The three-dimensional reconstruction system according to claim 9, wherein the step of performing three-dimensional reconstruction according to the local pose error and the initial reconstruction error to obtain the initial reconstruction model comprises:

constructing an initial optimization object function by using the local pose error and the initial reconstruction error;

solving the initial optimization object function to obtain initial pose data when the initial optimization object function takes the minimum value; and performing three-dimensional reconstruction by using the initial pose data to obtain the initial reconstruction model.

13. The three-dimensional reconstruction system according to claim 9, wherein the step of optimizing the initial reconstruction model according to the global pose error and the final reconstruction error to obtain the final reconstruction model as a virtual reality result of three-dimensional reconstruction of the target comprises:

constructing a global optimization object function by using the global pose error and the final reconstruction error;

solving the global optimization object function to obtain global pose data when the global optimization object function takes the minimum value; and optimizing the initial reconstruction model by using the global pose data to obtain the final reconstruction model.

14. The three-dimensional reconstruction system according to claim 9, wherein the step of optimizing the initial reconstruction model according to the global pose error and the final reconstruction error to obtain the final reconstruction model as a virtual reality result of three-dimensional reconstruction of the target comprises:

constructing a global optimization object function by using the local pose error, the initial reconstruction error, the global pose error, and the final reconstruction error;

solving the global optimization object function to obtain global pose data when the global optimization object function takes the minimum value; and optimizing the initial reconstruction model by using the global pose data to obtain the final reconstruction model.

15. A non-transitory computer readable storage medium, having stored thereon a computer program which, when executed by a processor, implements steps of the three-dimensional reconstruction method, wherein the steps comprise:

taking a current image frame obtained by scanning a target through a sensor as a target image frame, performing local pose optimization by using the target image frame to obtain a local pose error;

performing neural network prediction on the target image frame to obtain an initial reconstruction error;

performing three-dimensional reconstruction according to the local pose error and the initial reconstruction error to obtain an initial reconstruction model;

taking image frames previous to the target image frame in an image sequence obtained by scanning the target through the sensor as historical image frames, and performing global pose optimization by using the historical image frames to obtain a global optimization result and a global pose error;

performing neural network completion on the global optimization result to obtain a final reconstruction error; and optimizing the initial reconstruction model according to the global pose error and the final reconstruction error to obtain a final reconstruction model as a virtual reality result of three-dimensional reconstruction of the target.

16. The non-transitory computer readable storage medium according to claim 15, wherein the step of performing neural network prediction on the target image frame to obtain the initial reconstruction error comprises:

training a neural network by using general sample data to obtain an initial neural network model;

performing modification on the initial neural network model by using the historical image frames and a final reconstruction model corresponding to each of the historical image frames to obtain a neural network prediction model; and performing neural network prediction on the target image frame by using the neural network prediction model to obtain the initial reconstruction error.

17. The non-transitory computer readable storage medium according to claim 16, wherein the step of performing neural network prediction on the target image frame to obtain the initial reconstruction error further comprises:

before the initial neural network model is modified and optimized by using the historical image frames and a three-dimensional reconstruction model corresponding to each of the historical image frames, removing non-ideal data of a missing region of the three-dimensional reconstruction model.

18. The non-transitory computer readable storage medium according to claim 15, wherein the step of performing three-dimensional reconstruction according to the local pose error and the initial reconstruction error to obtain the initial reconstruction model comprises:
- constructing an initial optimization object function by using the local pose error and the initial reconstruction error;
- solving the initial optimization object function to obtain initial pose data when the initial optimization object function takes the minimum value; and
- performing three-dimensional reconstruction by using the initial pose data to obtain the initial reconstruction model.

19. The non-transitory computer readable storage medium according to claim 15, wherein the step of optimizing the initial reconstruction model according to the global pose error and the final reconstruction error to obtain the final reconstruction model as a virtual reality result of three-dimensional reconstruction of the target comprises:
- constructing a global optimization object function by using the global pose error and the final reconstruction error;
- solving the global optimization object function to obtain global pose data when the global optimization object function takes the minimum value; and
- optimizing the initial reconstruction model by using the global pose data to obtain the final reconstruction model.

20. The non-transitory computer readable storage medium according to claim 15, wherein the step of optimizing the initial reconstruction model according to the global pose error and the final reconstruction error to obtain the final reconstruction model as a virtual reality result of three-dimensional reconstruction of the target comprises:
- constructing a global optimization object function by using the local pose error, the initial reconstruction error, the global pose error, and the final reconstruction error;
- solving the global optimization object function to obtain global pose data when the global optimization object function takes the minimum value; and
- optimizing the initial reconstruction model by using the global pose data to obtain the final reconstruction model.

\* \* \* \* \*